United States Patent [19]

Laviana et al.

[11] 4,119,936

[45] Oct. 10, 1978

[54] THERMOSTAT CONTROLLER

[75] Inventors: Lawrence J. Laviana, Kensington, Conn.; Mark H. Rhodes, Jr., Sandisfield, Mass.; Edward J. Doyle, Avon, Conn.

[73] Assignee: M. H. Rhodes, Inc., Avon, Conn.

[21] Appl. No.: 734,721

[22] Filed: Oct. 22, 1976

[51] Int. Cl.² .......................................... H01H 37/02
[52] U.S. Cl. .................................. 337/303; 337/305; 236/46 R
[58] Field of Search ...................... 236/46 R, 46 F; 337/304, 305, 301, 302, 303

[56] References Cited

U.S. PATENT DOCUMENTS

| | | | |
|---|---|---|---|
| 3,834,618 | 9/1974 | Buckwalter | 337/304 X |
| 4,014,499 | 3/1977 | Hamilton | 337/302 X |
| 4,035,752 | 7/1977 | Anderson | 337/304 X |

Primary Examiner—George Harris
Attorney, Agent, or Firm—Hubbell, Cohen, Stiefel & Gross

[57] ABSTRACT

A timer controlled heat emission device for modifying the operation of a wall mounted thermostat includes a housing slidably mounted on the wall adjacent the thermostat, an electrical heating element disposed in the housing in heat emission relation with the thermostat, switching means movable between a first position in which the heating element is connected to a source of electricity and a second position in which the heating element is disconnected from the source, a timer activatable for a preselected time period, and control means operatively connected to the timer for moving the switching means between the two positions upon the activation and deactivation of the timer.

11 Claims, 5 Drawing Figures

U.S. Patent  Oct. 10, 1978  4,119,936
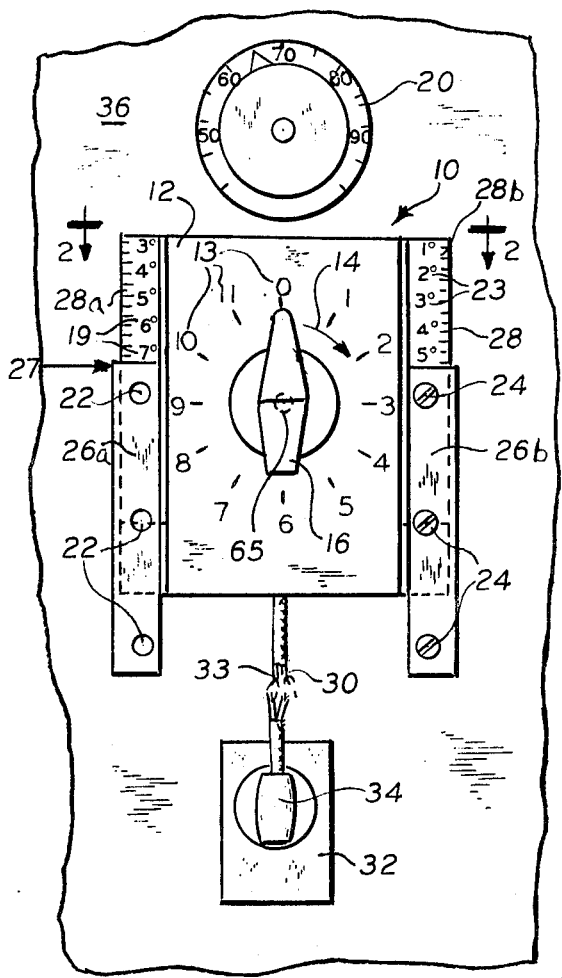
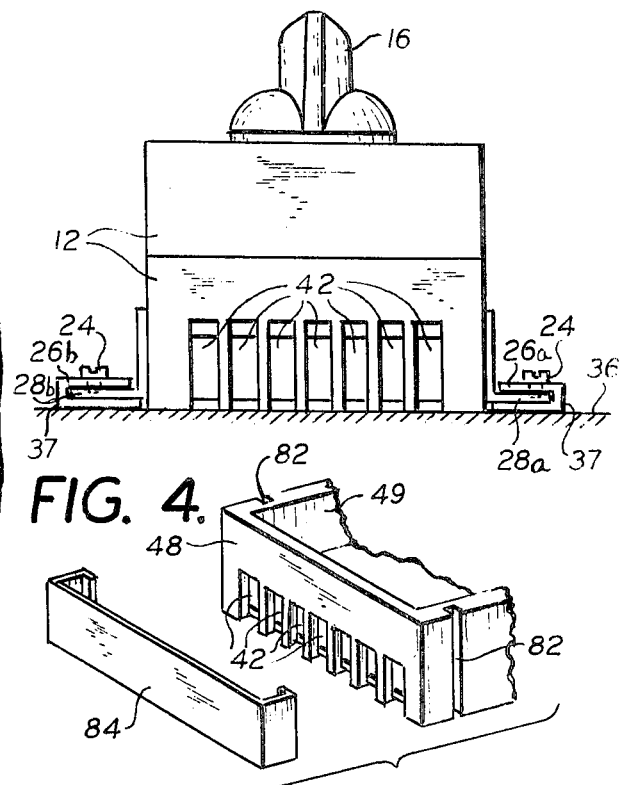
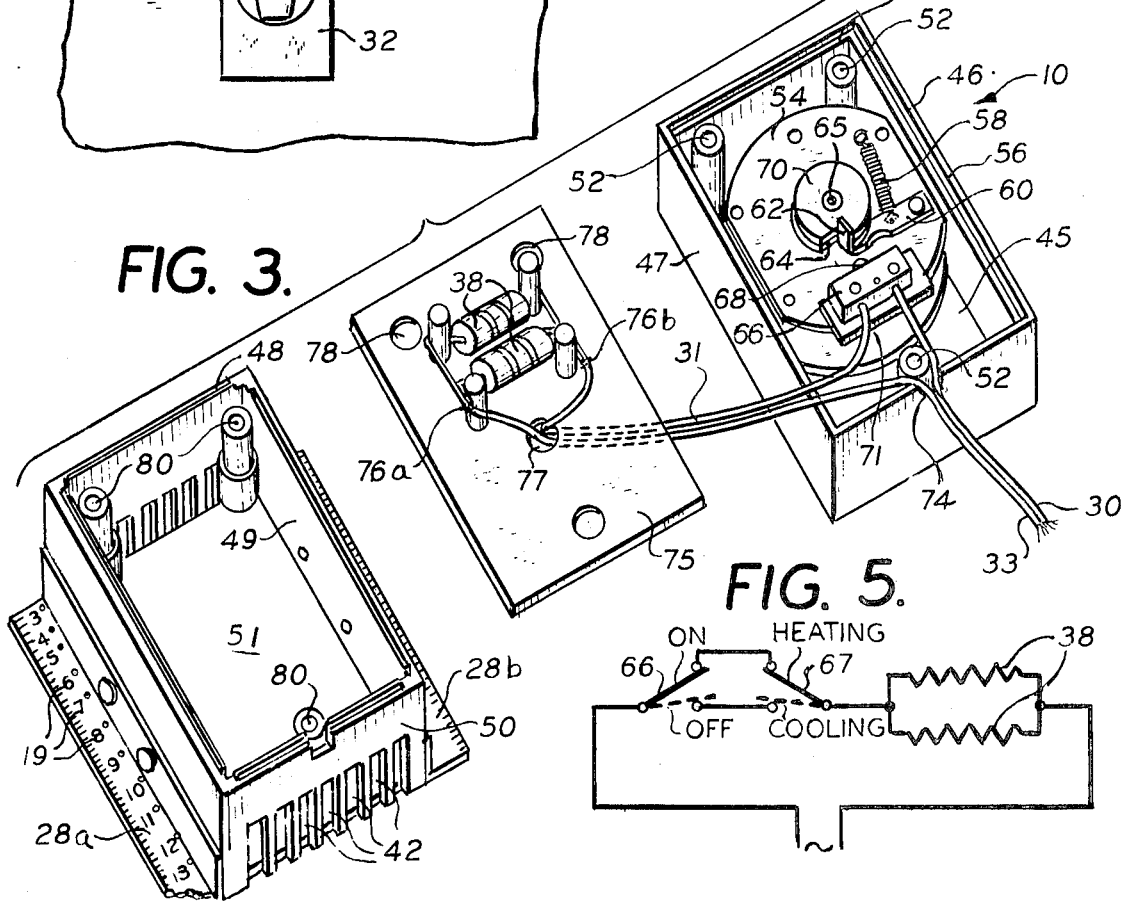
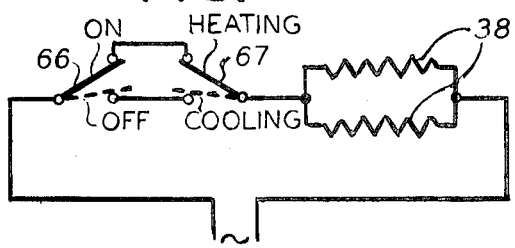

THERMOSTAT CONTROLLER

BACKGROUND OF THE INVENTION

1. Field of the Invention

This invention pertains generally to thermostat control devices and more specifically to thermostat control devices of the type which employ time controlled heat emission to modify the temperature sensed by the thermostat.

2. Prior Art

The concept of utilizing heat emitted from a heating element to supplement the control of a thermostat is well known. For example, U.S. Pat. No. 2,969,916 discloses the use of resistance heating to effect premature operation of a thermostat in a heating or cooling system. U.S. Pat. Nos. 2,838,332, 3,784,094, 3,339,043, 2,628,034 and 1,809,293 are further exemplary of prior art temperature control systems which utilize this concept.

Due to the recent energy crisis and its accompanying increase in the cost of fuel there has been an increasing consumer demand for fuel saving devices. This invention relates to one such class of devices, namely those in which time controlled heat emission is employed to modify the operation of a thermostat control. Typically, such devices contemplate a resistor positioned near a thermostat, the flow of current to the resistor being controlled by a timer. When current flows through the resistor, the resistor emits heat with the result that the thermostat senses the higher "local" temperature caused by the resistor rather than the general room temperature actually present in the room. Consequently, the heating system delivers less heat to the room and fuel savings result. Of course, when no current is flowing through the resistor, the "local" temperature is the same as the general room temperature and the thermostat operates in the conventional fashion. Such devices are generally employed in connection with a thermostat regulated heating system and provide the capacity to activate or deactivate the heating system at some preselected time in the future. In modified form, these devices may also be employed in connection with thermostat regulated cooling systems.

In one such device, manufactured by the Fuel Sentry Corporation and marketed under the name Fuel Sentry, the resistive element is disposed in a housing which is fixedly secured to the wall beneath the thermostat. A cyclical timer is contained in a separate enclosure which is adapted to be plugged directly into a standard wall outlet. A wire connects the resistive element to the timer enclosure. The only means provided in this device for adjusting the quantum of heat radiated to the thermostat is a damper which may be interposed between the resistive element and the thermostat. Moreover, inasmuch as the timer is disposed in an enclosure which is plugged directly into the wall, the user must gain access to the wall outlet each time he wishes to reset the timer. This is particularly disadvantageous to the elderly and infirm since outlets are often located on the lower portions of the wall and access to them is frequently obscured by furniture.

SUMMARY OF THE INVENTION

The timer controlled heat emission device of the present invention includes an electric heating element, preferably a resistance, disposed in a housing which is slidably mounted on the wall beneath the thermostat whose operation is to be controlled. By adjusting the distance of the housing from the thermostat, the amount of heat radiated to the thermostat may be varied.

Preferably, the portion of the housing in confronting relation with the thermostat is apertured, the resistance being disposed in the housing adjacent the apertures and in heat emission relation with the thermostat. A two-position switch is connected between the heating element and a suitable source of electricity such that when the switch is in a first position the heating element is connected to the source and heat is radiated from the heating element to the thermostat, and when the switch is in a second position the heating element is disconnected from the source and no heat is emitted therefrom. Preferably the source comprises a conventional wall outlet. An interval timer disposed in the housing and activatable for a preselected time interval is connected to the switch for moving the switch between the first and second positions upon the activation and deactivation of the timer.

In a preferred embodiment, the device includes means for accurately indicating the difference between the actual room temperature and the temperature sensed by the thermostat as the distance from the heating element to the thermostat is varied by slidably adjusting the position of the housing.

When the thermostat is controlling a heating system, the user simply sets the interval timer for a time period corresponding to approximately one half hour less than the period for which reduced heating is desired. By referring to the indicating means while adjusting the distance of the housing from the thermostat, a wide range of reduced room temperatures may be selected. Upon the activation of the timer, the switch is moved to the first position in which the heating element is connected to the source of electricity. The heat emitted from the heating element causes the thermostat to sense the higher temperature resulting from the heat from the resistor rather than the temperature generally present in the room with the result that less heat is delivered to the room and fuel savings are effected. After the time interval selected on the timer has expired, the switch is moved to the second position in which the connection between the heating element and the source is interrupted. The resistor ceases generating heat and the temperature sensed by the thermostat is then the actual room temperature with the result that the room is reheated to a comfortable temperature determined solely by the thermostat setting.

By slightly modifying the device as will be more fully described in the following detailed description and annexed drawings, the device may be employed to effect fuel savings in a thermostat regulated cooling system.

In a particular embodiment of the device, in which the device is situated on the wall beneath the thermostat, the portion of the housing opposite the upper apertured portion is also apertured in order that advantage may be taken of convection currents which result in increased heat transmission to the thermostat.

In a further embodiment, a damper is provided for shielding the upper apertures. When the apertures are thus shielded the quantum of heat transferred to the thermostat is reduced. By employing the damper in conjunction with the sliding mounting means, an expanded range of temperature control is obtained.

Further features and advantages of the present invention will become apparent from the following detailed description and annexed drawings which disclose a non-limiting example of an embodiment preferred at present together with modifications thereto.

BRIEF DESCRIPTION OF THE DRAWINGS

In the drawings:

FIG. 1 is a front elevation view showing the preferred thermostat control device mounted on a wall beneath a thermostat;

FIG. 2 is a view partly in section and partly in elevation taken along the line 2—2 in FIG. 1;

FIG. 3 is an exploded perspective view of the preferred thermostat control device without the mounting brackets. For purpose of illustration, the front section and insulating partition are substantially shown as viewed from the rear in FIG. 1 while the rear section is substantially shown as viewed from the front in FIG. 1;

FIG. 4 is a fragmentary perspective view showing an alternative embodiment of the preferred thermostat control device; and FIG. 5 is a schematic representation showing an alternative embodiment of the switching means of the preferred thermostat control device.

DETAILED DESCRIPTION

Referring now to the drawings in detail and particularly to FIGS. 1 and 3 thereof, the thermostat control device 10 of the present invention is shown mounted on a wall 36 beneath a conventional thermostat 20. Typically, the thermostat 20 will control the temperature in a volume such as a room partially defined by the wall 36. Of course the temperature of an entire structure including several rooms may be controlled by one thermostat 20.

The device 10 includes a housing 12. As presently preferred and shown in FIG. 3, the housing 12 is a two-piece plastic construction comprised of a front section 46 having a front wall 45 and sidewall 47, and a rear section 48 having a rear wall 51 and sidewall 49. The two sections 46 and 48 may be connected in any suitable manner. As presently preferred, a plurality of screws (not shown) secure the front and rear sections together, the screws extending through a plurality of screw posts 80 in the rear section 48 and being received in a plurality of threaded screw ports 52 extending upwardly from the wall 45 and in alignment with the posts 80. Preferably, provision is made for recessing the screws from the exterior surface of the wall 51 so that the screw heads will not interfere with the sliding movement of the housing 12 along the wall 36 as will become more fully apparent as this description progresses.

An interval timer 71 is secured within the housing 12 preferably by being fixedly secured to the wall 45, and while numerous timers are available for this purpose and any may be employed, the timer disclosed in U.S. Pat. No. 2,543,032, the contents of which are incorporated herein by reference in their entirety, is preferred.

The timer 71 is activatable for a variable preselected time interval by rotating a shaft 65 which extends through the wall 45, a knob 16 being fixedly seated on the end of the shaft 65 to facilitate manual rotation thereof. The timer 71 is activated by rotating the knob 16 in a clockwise direction as indicated by the solid arrow 14 in FIG. 1. After the activation of the timer and during the expiration of the preselected time interval, the shaft 65 is rotated by the timer in a counterclockwise direction, the shaft 65 returning to its initial position upon the expiration of the preselected time period.

Preferably, and as shown, indicia 13 are provided on the exterior surface of the wall 45 for indicating the angle of rotation necessary to activate the timer 71 for a range of preselectable time intervals.

Preferably, and as may be best seen in FIG. 2, the portion of the sidewall 49 of the housing 12 in confronting relation with the thermostat 20 has a plurality of apertures 42 provided therein. A heating element is disposed within the housing 12 adjacent the apertures 42 and, with device 10 located as shown in FIG. 1, in heating relation with the thermostat 20. Preferably, an electric heating element is employed since the precision of electric control is thereby extended to the transfer of heat. While a wide variety of electric heating elements well known in the art may be employed, preferably, and as shown in FIG. 3, the heating element comprises a pair of 1,000 ohm resistors 38 connected in parallel. Resistive heating is preferred since substantially all the electrical energy dissipated by the resistance is transformed into heat energy, the energy dissipated by the resistance being readily calculable from the formula $P = I^2R$ where I is the current flowing through the resistance (in amperes), R is the value of the resistance (in ohms), and P is the power (heat) dissipated by the resistance (in watts).

As presently preferred and shown in FIG. 3, the resistors 38 are thermally isolated from the timer 71 by mounting them on an insulating partition 75, the partition 75 being so dimensioned that it may be seated in a recess 72 which extends around the lip of the sidewall 47. Preferably the partition 75 is constructed of spring tempered brass, although other suitable materials well know to the skilled art worker may also be employed. A plurality of apertures 78 in alignment with the ports 52 and posts 80 are provided in the partition 75 so that when the device 10 is in assembled relation, the partition 75 will fit over the posts 80 and be fixedly secured in the housing 12. As shown, the resistors 38 are conductingly connected between a pair of terminals 76a and 76b which are fixedly secured to the partition 75. Preferably, the resistor leads are soldered to the terminals 76.

Current to the resistors 38 may be supplied by any suitable electric power source, it being understood that the power source forms no part of this invention. Preferably, however, the device 10 will be adapted for use with a conventional wall outlet, and this description is predicated on such use. Thus, referring to FIGS. 1 and 3 the device is shown connected to a 117V outlet 32 by a pair of wires 30 and 33 which extend through a hole 74 in the sidewall 47, and terminate in a conventional wall plug 34.

Referring now to FIG. 3, switching means are provided for regulating the flow of current from the source to the resistors 38 such that current will only be supplied to the resistors 38 during the period when the timer 71 is activated. While this may be accomplished in a variety of well known ways, the particular arrangement shown in FIG. 3 is preferred. Thus, the wire 33 extends through an aperture 77 in the partition 75 and is conductingly connected directly to the terminal 76a. The wire 30 is conductingly connected to one side of a two-position switch 66 having a push button control 68. As shown, the switch 66 is fixedly mounted on a mounting partition 54 which forms an enclosure for the timer 71. The other side of the switch 66 is connected to the terminal 76b by a wire 31 which extends through the aperture 77, the switch 66 providing an electrically conductive path between the wires 30 and 31 when the button 68 is depressed.

Control means operatively connected to the timer 71 are provided for depressing and releasing the button 68 upon the activation and deactivation of the timer 71. As presently preferred and shown in FIG. 3, the control means includes a disc 70, an actuating member 60, and a spring 58. The disc 70 has an angular peripheral notch 64 and is mounted for rotation on the end of the shaft 65 which, as shown, extends through the partition 54. The actuating member 60 has an upwardly extending end portion 62 and is pivotally mounted on the partition 54. The end portion 62 is urged into contact with the periphery of the disc 70 by the spring 58 which is fixedly mounted on the partition 54 and connected to the member 60.

Referring now to FIGS. 1 and 3, means are provided for slidably mounting the housing 12 on the wall beneath the thermostat 20. As presently preferred and shown, a pair of flanges 28 extend outwardly from the section 48 flush with the transverse wall 51. A pair of brackets 26 are mounted in parallel relation on the wall 36, each of the brackets 26 having a groove 37 extending therethrough such that the flanges 28 may be slidingly inserted within the grooves 37 as shown in FIG. 1. While the brackets 26 may be mounted on the wall 36 in a variety of well known ways, preferably an adhesive applied to the mounting surface of the brackets 26 is employed, the selection of a suitable adhesive such as a pressure sensitive adhesive being well within the capabilities of the skilled art worker. As shown, each of the brackets 26 has a plurality of threaded screw holes 22 for accommodating a plurality of set screws 24. The screws 24 secure the flanges 28 in the brackets 26 and thus hold the housing 12 in the desired position relative to the thermostat 20. Preferably, and as will be more fully explained as this description progresses, at least one of the flanges 28 has a plurality of temperature calibrations 19 thereon which indicate the additional heat sensed by the thermostat 20 as the distance of the housing 12 from the thermostat 20 is varied.

As shown, the lowermost portion of the sidewall 47 is also preferably provided with a plurality of apertures 43. Taken together, the apertures 42 and 43 provide a convection path through the housing 12 and insure that substantially all the heat emitted from the resistors reaches the thermostat 20.

In operation, the user of the device 10 will mount the brackets 26 on the wall 36 at a predetermined distance from the thermostat 20, the distance being dependent upon the calibrations 19 on the flanges 28 as will be more fully appreciated as this description progresses. The housing 12 is then slidably inserted via the flanges 28 in the grooves 37 and is secured by the set screws 24 in the desired position which is selected as will be more fully explained below. The plug 34 is then inserted in the socket 32 and the device 10 is ready for use.

Now assume that the user of the device 10 plans to leave his home, office, etc. for a given period of time say, 3½ hours, and assume further that the temperature outside is rather cold. Normally, the user will be faced with two apparently conflicting desires, namely to turn the heat down so that fuel costs may be saved and on the other hand to have the room suitably heated upon his return. The device 10 may be used to accomplish both of these objectives.

Before leaving the room, the user of the device will rotate the knob 16 in a clockwise direction in FIG. 1 to the setting marked "3" which will activate the timer 71 for a 3 hour period. The thermostat 20 is set at the temperature to which the room is to be heated upon the user's return.

Rotation of the knob 16 rotates the shaft 65 and hence the disc 70, at which point the camming action of the notch 64 urges the end portion 62 out of the notch 64 and onto the periphery of the disc 70. Simultaneously, the end portion 62 depresses the push button 68 of the switch 66 thus "closing" the switch 66 and completing the circuit from the resistors 38 to the outlet 32.

As current flows through the resistors 38 they emit heat which passes through the apertures 42 by convection and radiation to the thermostat 20. This causes the thermostat 20 to sense a higher temperature than the actual general ambient temperature in the room and results in less heat being supplied to that room. Thus, the first objective of the user is accomplished, that is, fuel costs are saved. As the three hour preselected time period expires, the knob 16 is rotated back to its initial position until it has returned to the point marked "0". Simultaneously therewith, the disc 64 is rotated back to its initial position at which point the end portion 62 is aligned with the notch 70 and pulled therein by the action of the spring 58. This releases the push button 68 and "opens" the switch 66 thereby interrupting the circuit from the resistors 38 to the source which results in the termination of heat emission from the resistors 38. At this point the thermostat 20 will sense the actual room temperature and will cause heat to be supplied to heat the room in the conventional manner to the temperature selected on the thermostat setting. Thus, by the time the user returns, a comfortable temperature level will have been attained.

It will be readily apparent to the skilled art worker that since the values of the voltage source and the resistors are known, the amount of heat emitted from the resistors 38 may be readily calculated. By instructing the user to mount the brackets 26 at a given distance below the thermostat 20, the flanges 28 may be calibrated with respect to a reference point to indicate the reduction in room temperature for any given distance of the housing 12 from the thermostat 20. Preferably, and as shown in FIG. 1, the calibration comprises temperature indicia 19 on the left flange 28a, the reference point preferably being the top of the left bracket 26a, although any suitable reference point on the bracket 26a may be selected. In FIG. 1, the reference point is designated by the arrow 27. By subtracting the temperature indicated at the reference point from the temperature indicated on the thermostat setting, the user may readily determine what the temperature in the room will be in his absence. This is particularly advantageous in that it may be desirable to maintain the temperature in the room above a certain minimum level at all times. Thus, with reference to FIG. 1, subtracting the temperature indicated by the calibration 19 nearest the top of the bracket 26a, 7° F., from the temperature shown on the thermostat setting, 65° F., the room temperature during operation of the device 10 may be readily calculated, i.e. 58° F.

FIG. 4 shows a further modification to the device 10. As shown, a damper 84 of preferably metallic construction is slidably mounted in a pair of grooves 82 in the sidewalls 49 of the section 48, the damper 84 being movable into overlying relation with the apertures 42. With the damper 84 covering the apertures 42 the amount of heat from the resistors applied to the thermostat 20 will be reduced by a given amount depending upon the material from which the damper 84 is constructed. Thus, the damper 84 provides the device 10 with an even greater range of temperature control. As presently preferred, when this modification is employed, the right flange 26b in FIG. 1 is provided with additional calibrations 23 which convey the same information as the calibrations 19, the calibrations 23 being used only when the damper 84 is in sealing relation with the apertures 42.

Referring now to FIG. 5, a schematic representation of a modified switching means is shown which may be employed in order that the device 10 may be used in conjunction with both heating and cooling systems. In FIG. 5 the switch 66 corresponds to the switch 66 shown in FIG. 3 and described above, the "on" and "off" positions corresponding to the resistors 38 being connected and disconnected from the source, respectively. As shown, a second two-position switch 67 is connected in series with the switch 66 and the resistors 38. Preferably, the switch 67 is manually operable from the exterior of the housing 12. When the switch 67 is in the position marked "heating" the device 10 will operate as described above.

However, when the switch 67 is in the positioned marked "cooling" the device 10 will operate substantially in reverse, that is, current will be supplied to the resistors 38 when the timer is deactivated and no current will be supplied when the timer is activated. Thus, when the device 10 is to be used in conjunction with a cooling system, the switch 67 is thrown to the position marked "cooling" and the thermostat 20 is set at the highest temperature at which the room is to be maintained during the period of the user's absence, for example, 80°. Assuming it is desired to have the room cooled to 68° before the user returns, the position of the housing 12 is slidably adjusted in the brackets 26 until the calibration 19 on the flange 28 at the reference point reads 12°. The knob 16 is then rotated, as described above, to activate the timer for approximately one-half hour less than the anticipated period of absence. Upon activation of the timer, the switch 66 is moved to the "on" position as described above, and as shown in the schematic representation in FIG. 5, the circuit from the source to the resistors 38 is disconnected. Thus, the thermostat will sense the true room ambient temperature and regulate it to the value set, e.g., 80°. Upon the expiration of the activation period, the switch 66 is moved to the "off" position and current from the voltage source is supplied to the resistors 38 causing them to emit heat as is more fully described above. Since the thermostat 20 now senses an additional 12°, it actuates the cooling system to reduce the temperature in the room by that amount, i.e. to 68° F. in the given example. Thus, when the user of the device 10 returns to the room it will be pre-cooled to the desired temperature. To further conserve electricity, the user, upon his return, may return the switch 67 to the position marked "heating" which will disconnect the resistors 38 from the source and return the thermostat 20 to normal operation. The thermostat 20 may then be set at any desired temperature in the conventional manner.

It will be obvious that a device 10 for controlling a thermostat which in turn controls a cooling system need not incorporate means for converting it to operation with heating means. It could be a single function device in which event the switch 67 could be omitted.

Although the Farenheit scale has been employed throughout the preceeding description, it is readily apparent that the device 10 may be employed with any other temperature scale such as for example, the Celsius or Kelvin scales.

In a further alternative embodiment of the device 10, the resistive element comprises a variable resistance or rheostat which may be varied by rotating a shaft which extends through the transverse wall 45 of the housing 12. When such an arrangement is employed, even greater flexibility as to the amount of heat applied to the thermostat 20 will be enjoyed.

While a preferred means for slidably mounting the housing 12 on the wall 36 has been shown and described above, numerous other means well within the capabilities of the skilled art worker may likewise be employed.

While I have herein shown and described a preferred embodiment of the present invention and have suggested modifications thereto, other changes and modifications may be made within the scope of the appended claims without departing from the spirit and scope of this invention.

Having thus described the invention, what is claimed is:

1. A thermostat control device for use with a wall mounted thermostat comprising:
   a bracket fixedly mountable on the wall adjacent the thermostat, said bracket having a groove therein;
   a housing, a flange extending outwardly from the housing, said flange being slidably receivable in said groove for varying the distance of said housing from said thermostat;
   an electric heating element disposed in the housing for heating the thermostat when said control device is mounted on the wall adjacent said thermostat;
   means for connecting said heating element to a source of electricity, switching means movable between a first position in which said electric heating element is connected to the source of electricity and a second position in which the heating element is disconnected from the source;
   a timing means disposed in said housing, said timing means being manually activatable for a preselected time interval and including means for deactivating said timing means upon the passage of said preselected time interval after activation thereof; and
   control means operatively connected to said timing means for moving said switching means between said two positions upon the activation and deactivation of the timing means.

2. The thermostat control device of claim 1 wherein said switching means is moved to said first position upon said timing means being activated, and to said second position upon said timing means being deactivated.

3. The thermostat control device of claim 1 wherein said housing has an apertured upper wall in confronting relation with said thermostat and an apertured lower wall opposite said upper wall.

4. The thermostat control device of claim 1 further comprising indicia means for correlating the position of said housing relative to said bracket with the amount of heat transmittable to said thermostat by said heating element.

5. The thermostat control device of claim 4 wherein said bracket is secured to said wall at a predetermined distance from said thermostat, and wherein said correlating indicia means are on said flange.

6. The thermostat control device of claim 3 further comprising a damper removably mountable in overlying relation with said apertured upper wall.

7. The thermostat control device of claim 1 further comprising means for thermally insulating said heating element from said timing means.

8. The thermostat control device of claim 7 wherein said thermal insulating means comprises a heat insulating partition disposed in said housing between said heating element and said timing means.

9. The thermostat control device of claim 1, further comprising a fixed mounting partition disposed in said housing for supporting said control means;
wherein said switching means comprises a push button actuated electrical switch, said switch being closed when said push button is depressed and open when said push button is undepressed;
wherein said means for activating said timing means comprises a shaft, a manually operable knob mounted on said shaft for rotating said shaft in one direction away from an initial position for activating said timing means and wherein said means for deactivating said timing means is connected to said shaft for rotating said shaft in the reverse direction during the preselected time interval for returning said shaft to its initial position on the expiration of said time interval; and wherein said control means comprises:

(a) a disc having a peripheral notch therein, said disc being fixedly secured to said shaft for rotation therewith,
(b) an actuating member having an end portion in engagement with the periphery of said disc, the other end of said actuating member being pivotally mounted on said partition, and
(c) a spring, one end of said spring being secured to said partition and the other end being secured to said actuating member for holding said end portion into engagement with the periphery of said disc, said end portion, said disc, and said push button being relatively positioned so that said end portion is disposed in said notch in said disc and out of engagement with said push button when said timing means is deactivated, said end portion engaging and depressing said push button when said end portion is moved out of said notch upon the rotation of said disc.

10. The thermostat control device of claim 1 wherein said switching means is moved to said second position upon said timing means being activated, and to said first position upon said timing means being deactivated.

11. The thermostat control device of claim 1, and further comprising:
an additional bracket fixedly mountable on the wall adjacent the thermostat, said additional bracket having an additional groove therein; and
an additional flange extending outwardly from the housing, said additional flange being slidably receivable in said additional groove.

* * * * *